United States Patent [19]
Ferg

[11] Patent Number: 5,569,914
[45] Date of Patent: Oct. 29, 1996

[54] METHOD FOR MEASURING HEIGHT OF FILL IN A PRODUCTION TUBING/CASING ANNULUS

[75] Inventor: Thomas E. Ferg, Houston, Tex.

[73] Assignee: Phillips Petroleum Company, Bartlesville, Okla.

[21] Appl. No.: 529,811

[22] Filed: Sep. 18, 1995

[51] Int. Cl.$^6$ .................................................. G01V 5/00
[52] U.S. Cl. .................................. 250/260; 250/357.1
[58] Field of Search .................................. 250/259, 260, 250/357.1

[56] References Cited

U.S. PATENT DOCUMENTS

| | | |
|---|---|---|
| 2,540,049 | 1/1951 | Hinson .................................. 250/260 |
| 2,972,050 | 2/1961 | Allen .................................. 250/357.1 X |
| 3,796,883 | 3/1974 | Smith et al. . |
| 3,835,317 | 9/1974 | Vann . |
| 3,959,647 | 5/1976 | Groddle . |
| 4,178,506 | 12/1979 | Fertl .......................................... 250/260 |
| 4,493,999 | 1/1985 | Catchen .................................. 250/260 |
| 5,182,051 | 1/1993 | Bandy et al. . |

Primary Examiner—Carolyn E. Fields
Assistant Examiner—Edward J. Glick
Attorney, Agent, or Firm—George E. Bogatie

[57] ABSTRACT

The location in a wellbore of the top of a quantity of fill material which is sufficient to restrict flow in a tubing/casing annulus at a location deep in a well is determined by dropping a radioactive source through the annulus so that it falls to the top of the fill material. The depth of the thus deposited radioactive source is detected by radiation measurements, and the measured depth infers the location of the top of the fill material.

12 Claims, 4 Drawing Sheets

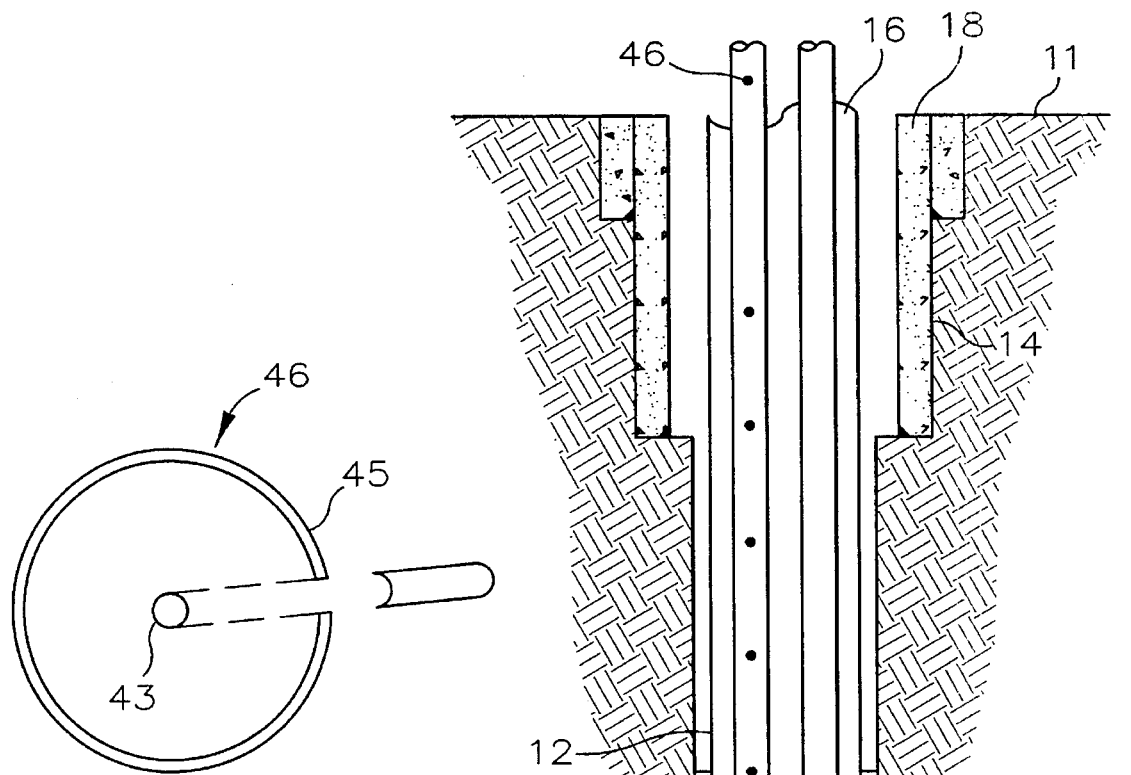
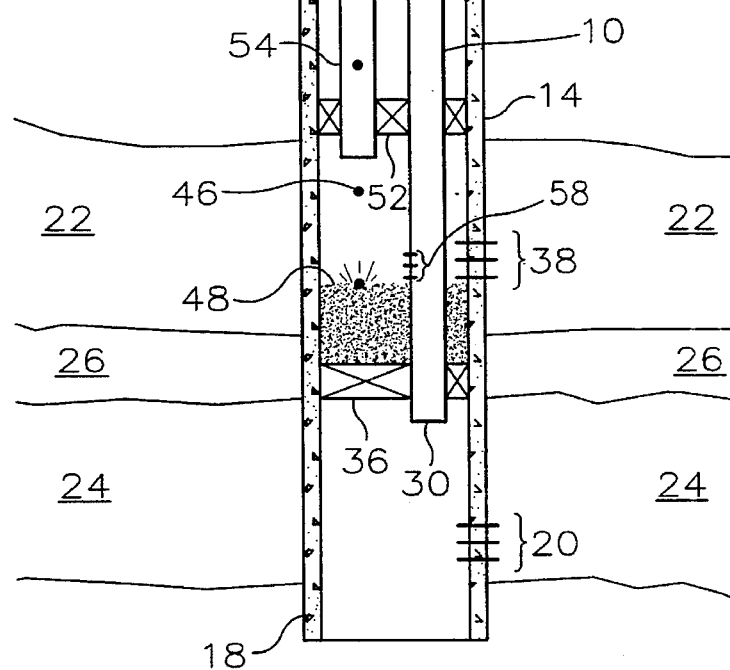
FIG. 3
FIG. 2

5,569,914

METHOD FOR MEASURING HEIGHT OF FILL IN A PRODUCTION TUBING/CASING ANNULUS

The present invention relates to oil field operations, and more particularly to a method for determining the location of the top of a quantity of material which fills in a subsurface section of the production tubing/casing annulus within a well.

BACKGROUND OF THE INVENTION

Producing gas and oil wells necessarily include a borehole which extends downwardly from the surface of the earth to a subterranean zone containing hydrocarbons to be produced. A casing, which is a special steel tubing welded or screwed together, is lowered into the borehole to prevent collapse of the borehole. This casing is then generally cemented between the casing and the borehole wall for at least a portion of its length to further stabilize the borehole and provide additional strength against pressures which could collapse the borehole. Cementing the casing also provides the benefit of isolating zones which may produce oil, gas or water.

Production tubing is run axially within the casing. This tubing may hang free or be latched into a production packer. The space between the interior of the casing and the exterior of the tubing is commonly referred to as the tubing/casing annulus. To establish production the casing, surrounding cement sheath and the producing formation are perforated at desired depths by various methods as known to those skilled in the art.

In oil field operations it is often advantageous for a single well to produce from multiple zones which are by their nature higher and lower within the wellbore. A packer is set between these zones at a determined depth in order to isolate production from higher and lower perforated intervals (zones) within the wellbore. A production string, which traverses the upper zones and terminates in the packer, produces the lower zone. A second production string may be introduced into the same production tubing/casing annulus in order to produce the upper zones, or the upper zones may be produced without tubing, i.e., production is brought to the surface through the tubing/casing annulus.

When the reservoirs (zones) are producing, mobile granular material may enter the wellbore from the formation and this material may deposit within the annular space. In addition, precipitation of dissolved minerals and salts may occur and deposit material within the annular space as a result of temperature and pressure changes as fluids enter the wellbore.

At some point during the production life of a well it may be desirable to commingle the production from upper and lower zones. At this juncture it is critical that the location (depth) of fill and/or precipitates be known. In order to commingle production the long tubing string which traverses the upper zones is desirably perforated at a point above any granular fill or deposited precipitates.

Knowledge of the height of granular fill and/or deposited precipitates is important for determining:

1) whether perforations are covered by the fill material which may restrict production and necessitate a workover;
2) a correct perforation point for the commingling of upper and lower zones separated by a packer; and
3) a depth at which the tubing string is likely to be stuck. It is further noted that tubing may become stuck because of granular fill, or the precipitation of minerals and salts in the wellbore, or because of the collapse of casing. To reduce the time that a workover rig is on location at the well site and the costs associated therewith, it is desirable to know the depth at which the tubing is stuck prior to the arrival of the rig on location.

Thus, there is presently a need, which would be available to the oil and gas producer, for accurate, rapid and economical measurement of the top of fill material accumulated in a tubing/casing annulus.

Accordingly, it is an objective of this invention to determine the location of the top of material that accumulates in the tubing/casing annulus of a well at a point of depth from the surface of the earth.

It is a more specific object of this invention to determine the top of fill material through the use of gamma radiation measurements.

Another object is to determine the top of fill location in a rapid, economical and accurate manner.

Still another object is to operate a well in an efficient manner.

SUMMARY OF THE INVENTION

According to the present invention, the foregoing and other objectives and advantages are attained by depositing a radioactive source, which is embedded in a sphere, onto the top of a quantity of granular fill or precipitate material which blocks the tubing string or the tubing/casing annulus at a location deep in a well, and inferring the location of the top of this fill material through measurement of the emitted radiation of the radioactive source deposited on the fill material.

In a preferred embodiment for a well producing hydrocarbons from a lower zone through a production tubing string, and also producing hydrocarbons from a higher zone through the tubing/casing annulus, a radioactive sphere having a relatively short half line is introduced to the tubing/casing annulus at the wellhead. The sphere is allowed to fall by gravity through the annulus to the top of the fill material. A conventional cased hole gamma ray tool is then run down the production tubing string and the depth location of the top of fill is determined by the sensing of the location of the emitted radiation of the radioactive sphere.

In a second preferred embodiment for a well containing two production tubing strings, each terminating at different production zones, i.e., one higher and one lower, the radioactive sphere is introduced through the production tubing string of the higher zone, and allowed to fall to the top of the fill material. The gamma ray logging tool is then run into the production tubing string of the lower zone to determine the depth of fill.

In a third preferred embodiment the radioactive sphere is introduced into the tubing/casing annulus and allowed to fall by gravity to the location of a potentially collapsed casing. The gamma ray logging tool is then run in the production tubing and the location of the top of the obstruction in the annulus determined through detection of the radiation emitted by the radioactive sphere.

Other objects and advantages of the invention will be apparent from the foregoing brief description of the invention and the claims as well as a detailed description of the drawings which are briefly described as follows:

BRIEF DESCRIPTION OF THE DRAWINGS

FIG. 2 is a schematic cross section similar to FIG. 1B, but showing two production tubes in a single casing.

FIG. 3 is a cross sectional view of a sphere containing a source of gamma rays.

DETAILED DESCRIPTION OF THE PREFERRED EMBODIMENT

Figure 1A:
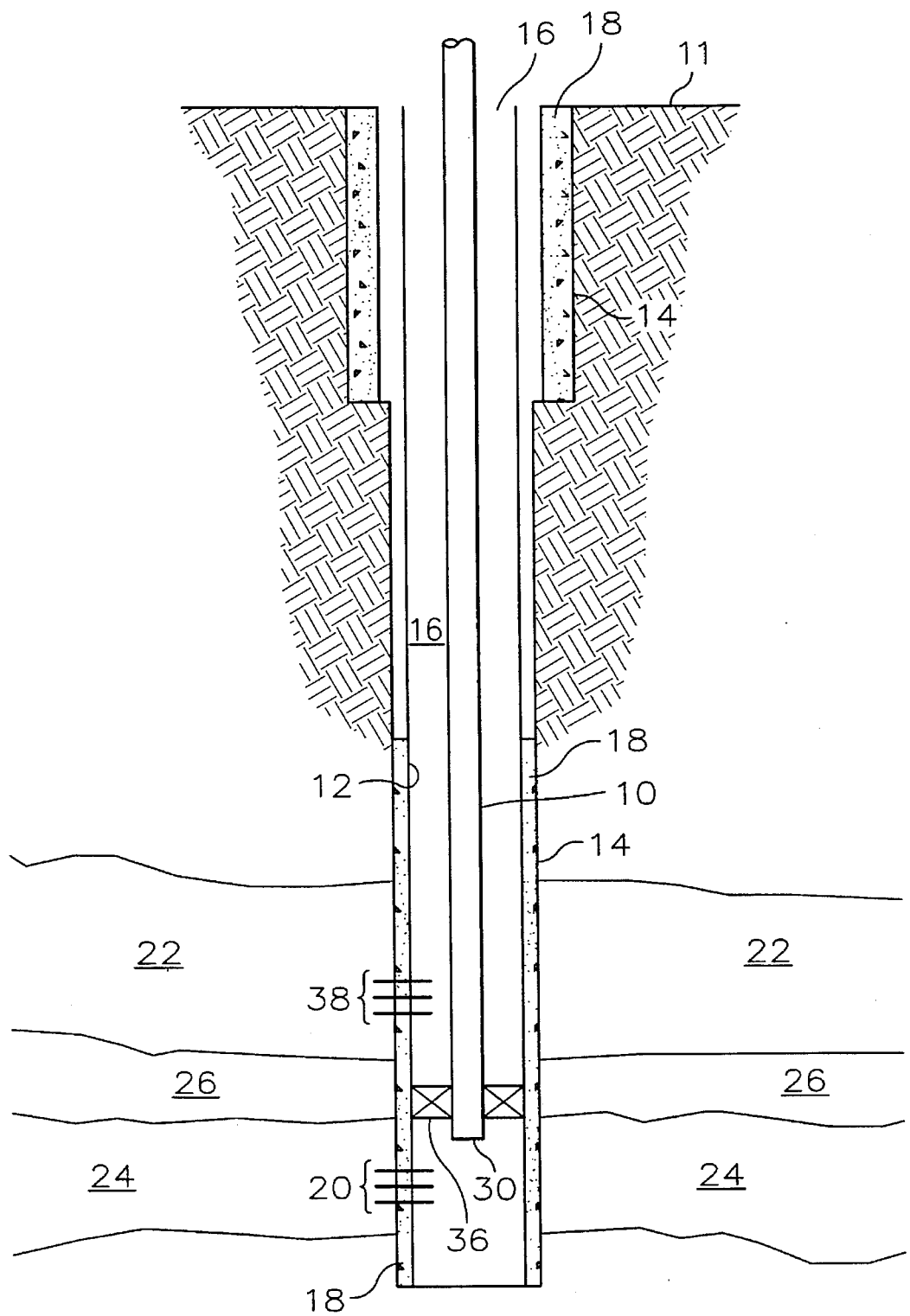
FIG. 1A is schematic cross section of a prior art well.

Refer now to the drawings in which common reference numerals indicate the same elements in the various figures. A typical cased well of the prior art is shown in FIG. 1A. A steel tubing string for casing 12 is located in borehole 14, and held firmly in the borehole 14 by cement 18. As illustrated, the production tubing string 10 is suspended within casing 12 to form the tubing/casing annulus 16. The tubing string 10 traverses several rock strata, including a higher producing zone 22, a non-producing zone 26, and a lower producing zone 24. The tubing terminates adjacent to production zone 24. Packer 36 is affixed to tubing string 10 and the inner wall of the casing 12 so as to isolate production zone 24, as is well known in the art. Casing 12 has perforations 20 through the casing, cement and formation, which are also made in a manner as is well known in the art. The perforations 20 are made at a selected depth adjoining the producing reservoir 24. As reservoir 24 is selected for production, hydrocarbons flow from the reservoir 24 through the perforations 20, and are brought to the surface 11 through the open end 30 of production tubing string 10.

In electing to produce hydrocarbons from the upper zone 22, the perforations 38 through the casing, cement and formation are made at a selected depth which is adjacent to the producing zone 22, and production fluid is brought to the surface 11 through tubing/casing annulus 16 in a manner as is well known in the art. As the well is produced granular material, which is typically sand, enters the annulus and accumulates on top of the packer 36. Also, precipitation of dissolved minerals and salts contained in wellbore fluids may occur and add to the quantity of fill material. Over a period of time the material accumulation in the annulus 16, illustrated at 44 in FIG. 1B, becomes sufficient to restrict or in some cases completely stop flow through the perforations 38 in the annulus 16. According to the invention the depth location on the top of the annulus fill material 48 is determined in a simple economical and efficient manner by gamma ray measurements as illustrated in FIG. 1C.

In this method one or more appropriately sized spheres 46 embedded with a source of gamma rays, is employed to mark the location of the top of the fill 48. A sphere 46 is dropped into the annulus 16 at the surface 11 and falls to the top of the fill material 48, where its emissions may be detected by well known methods. Particularly suitable radioactive spheres for marking the top of fill location includes spheres having a diameter from about ½ inch to about 1 inch, with a diameter of ¾ inches typically preferred. Specific gravity of the spheres ranges from about 0.75 to about 1.5 with about 1.2 typically preferred, such that the spheres can be supported by the fill material but yet be dense enough to fall rapidly to the top of the fill. Another important characteristic of the radioactive sphere is the half-life of the embedded radioactive source particle illustrated at 43 in FIG. 3. This property is selected based on the particular time period over which the measurements are to be made. Radioactive isotopes having half-lives from about 2 days to about 200 days are common. FIG. 3 discloses a typical sphere 26 having sealer 45 for the radioactive particle 43 which is suitable for disposal in the well such that recovery of the radioactive source is not required. U.S. Pat. No. 5,182,051 assigned to Protechnics International, Inc., Houston, Tex. discloses radioactive particles comprising a sintered material having embedded therein any of a variety of radioactive elements which are suitable for use in this invention. This patent is incorporated herein by reference for its disclosure of radioactive particles. Suitable spheres containing the radioactive particles for use this invention are sold by Protechnics International, Inc. of Houston, Tex.

Figure 1B:
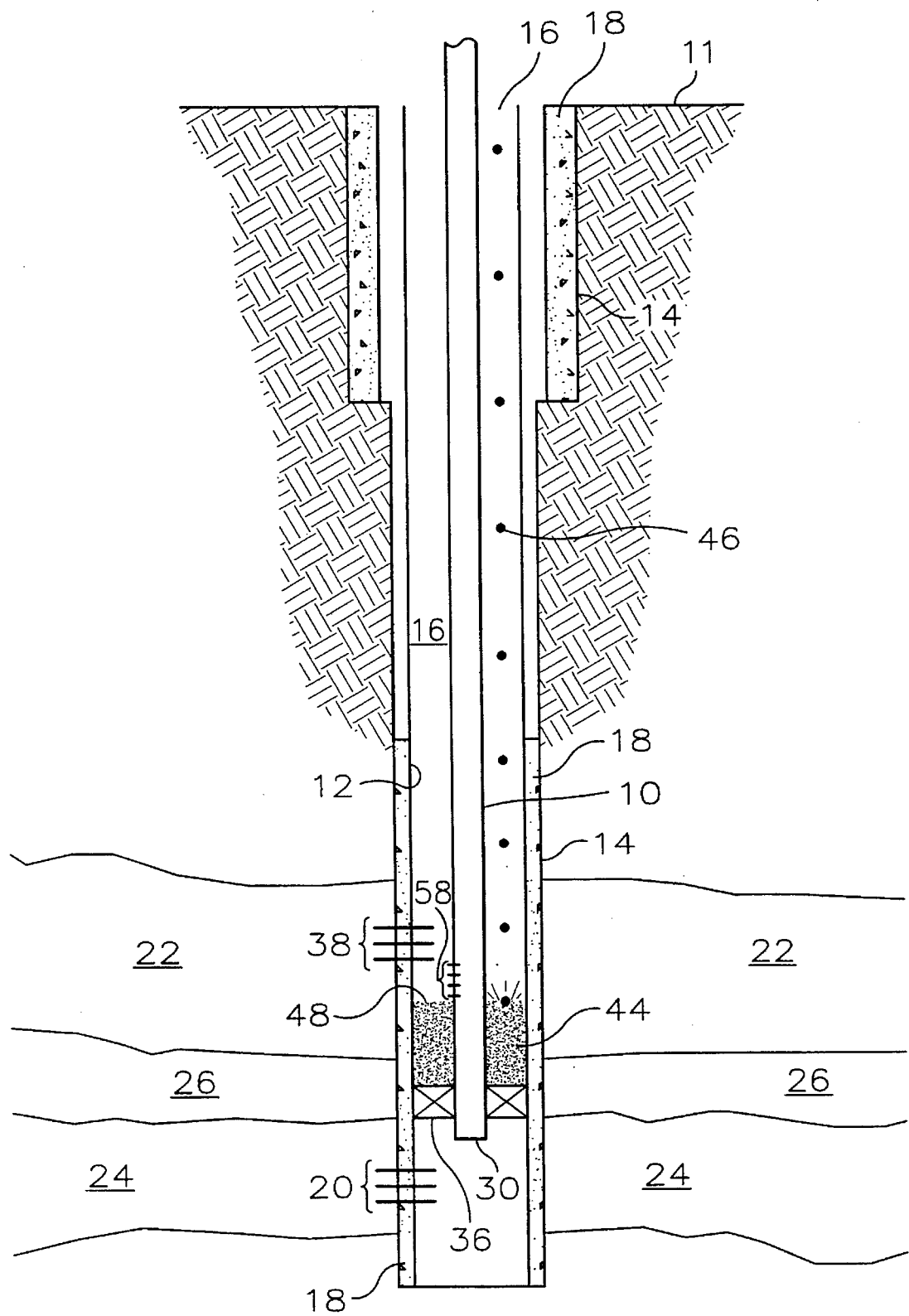
FIG. 1B is a cross section similar to FIG. 1A wherein a radioactive sphere is introduced in the tubing/casing annulus according to this invention.
Figure 1C:
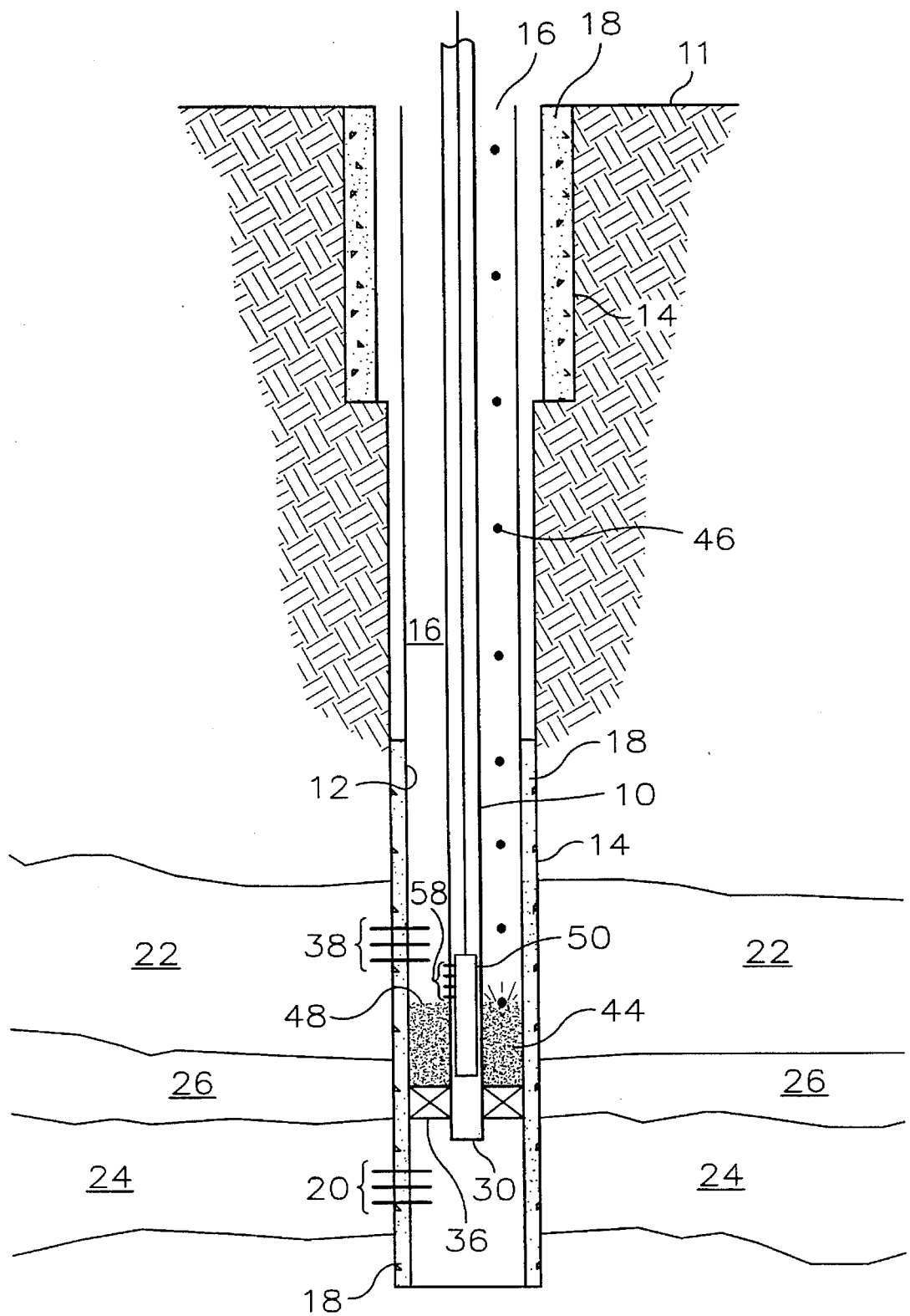
FIG. 1C is a cross section similar to FIG. 1A illustrating radiation measurement.

The depth location of the sphere 46 when supported on the fill material in the annulus 16 can be detected with known equipment as a gamma ray detector illustrated at 50 in FIG. 1C. The type of instrument contemplated is used in gamma ray well logging to detect natural radioactivity, and which can locate radioactive tracers which are pumped into the formation, usually during fracturing operations. By way of example, a Geiger counter or scintillation detector of known types for detecting gamma radiation may be employed as a detector 50 in FIG. 1C. If necessary to avoid interference from normally occurring radioactive material a spectral analysis technique can be employed to identify radiation from the specific radioactive elements embedded in the sphere 46.

In any specific embodiment of this invention the step of detecting the radioactive sphere after it has been dropped into the annulus and is resting on top of the fill material includes recognizing the difference between radiation of naturally occurring earth and formations and the radiation of the sphere. For example, a spectral type gamma radiation detector may be employed for detector 50. The detector 50 is lowered into the well for detecting the particular gamma radiation emitted from the deposited sphere 46.

FIG. 2 which is similar to FIG. 1, illustrates another embodiment of this invention where the upper zone 22 is isolated by installation of a second packer 52 and production is delivered to the surface from the upper zone 22 through a second production tubing string 54. In this configuration illustrated in FIG. 2 the radioactive sphere 46 is dropped to the top of the fill material through the tubing string 54.

In either well configuration, as illustrated in FIG. 1B or FIG. 2 it is apparent that locating the top of the fill material in annulus 16 will identify depth location suitable for making perforations 58 in the production tubing string 10 to allow fluid from production zone 22 to freely commingle in tubing string 10 with production from the lower zone 24. Further it should be apparent that a likely place for the tubing string to be stuck in a manner that would prevent the tube from being pulled out of the casing 12, is at the top of the fill material 48, such that the tubing string could be cut at that point prior to arrival of a workover rig which would, among other things, remove the fill material 44.

Accordingly, this invention is well adapted to achieve the objects and attain the advantages mentioned above as well as those inherently present. While the presently preferred embodiment of this invention has been described for the purpose of this disclosure, numerous changes in the construction and arrangement of parts and the performance of the steps are possible by those skilled in the art. Such changes are encompassed within the spirt of this invention as defined by the appended claims.

That which is claimed:

1. A method for determining the location of the upper extremity of a quantity of fill material which is sufficient to restrict flow within a tubing/casing annulus at a subsurface location in a well, said method comprising:

(a) depositing a radioactive source on the top of said fill material in said tubing/casing annulus;

(b) detecting the depth of said deposited radioactive source by radiation measurements; and (c) inferring the location of the upper extremity of said fill material based on the depth of said radioactive source detected in step (b).

2. A method in accordance with claim 1, wherein said radioactive source comprises:

a particle which is a source of gamma rays, said particle being embedded in a sphere.

3. A method in accordance with claim 2, wherein said step of depositing said radioactive source on top of said fill material comprises:

dropping said sphere containing said radioactive particle into said annulus from the surface of the earth; and allowing said sphere to fall to the top of said fill material.

4. A method in accordance with claim 3, where said sphere has a diameter in a range of about 0.5 inches to about 1.0 inch and a specific gravity in a range of from about 0.75 to about 1.25.

5. A method in accordance with claim 3, wherein said particle which is a source of gamma rays has a half-life in a range of from about 2 days to about 200 days.

6. A method in accordance with claim 1, wherein said fill material comprises sand and mineral deposits precipitated from wellbore fluids.

7. A method in accordance with claim 1, wherein said well produces hydrocarbons from a lower zone in a reservoir, and from a higher zone in said reservoir, and wherein hydrocarbon production from said lower zone is delivered to the surface through a tubing, and production from said upper zone is delivered to the surface through said tubing/casing annulus.

8. A method in accordance with claim 1, wherein said well produces hydrocarbons from a lower zone in a reservoir, and from a higher zone in said reservoir, and wherein hydrocarbon production from said lower zone is delivered to the surface through a first production tubing, and hydrocarbon production from said upper zone is delivered to the surface through a second production tubing.

9. A method in accordance with claim 1, wherein said step of detecting the depth of said radioactive source, comprises:

lowering a gamma-ray tool downhole for detecting said radioactive source.

10. A method in accordance with claim 9, wherein said gamma ray tool is selected from the group of tools consisting of a Geiger counter and a scintillation detector.

11. In a cased well producing hydrocarbons through perforations in the casing, and having a longitudinally extending production tubing string which cooperates with the casing to form a tubing/casing annulus, and wherein said tubing/casing annulus traverses at least two hydrocarbon bearing zones, a method for determining the location of the upper extremity of a quantity of granular fill material accumulated in said tubing/casing annulus, said method comprising:

(a) depositing a radioactive source material comprising a particle which is a source of gamma rays onto the top of said fill material in said tubing/casing annulus;

(b) detecting the depth in said tubing/casing annulus of said radioactive source by a gamma-ray tool lowered into said tubing;

(c) inferring the location of the upper extremity of said fill material based on the depth of said radioactive source in step (b).

12. A method in accordance with claim 11, wherein said radioactive source comprises a particle which is a source of gamma-rays embedded in a sphere, and where said sphere has a diameter of from about 0.5 in. to about 1.0 in. and a specific gravity of from about 0.75 to about 1.25.

* * * * *